United States Patent
Lv et al.

(10) Patent No.: US 10,793,763 B2
(45) Date of Patent: Oct. 6, 2020

(54) ULTRA-DRY THREE-PHASE FLUE GAS FOAM FOR OIL-GAS FIELDS AND PREPARATION METHOD THEREOF

(71) Applicant: CHINA UNIVERSITY OF PETROLEUM-BEIJING, Beijing (CN)

(72) Inventors: Qichao Lv, Beijing (CN); Wenqi Shao, Beijing (CN); Juan Zhang, Beijing (CN); Zhaoxia Dong, Beijing (CN); Meiqin Lin, Beijing (CN); Zihao Yang, Beijing (CN); Yang Liu, Beijing (CN); Rong Zheng, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 0 days.

(21) Appl. No.: 16/687,615

(22) Filed: Nov. 18, 2019

(65) Prior Publication Data
US 2020/0157406 A1    May 21, 2020

(30) Foreign Application Priority Data
Nov. 19, 2018   (CN) .......................... 2018 1 1375287

(51) Int. Cl.
| C09K 8/38 | (2006.01) |
| C09K 8/518 | (2006.01) |
| C09K 8/594 | (2006.01) |
| C09K 8/70 | (2006.01) |
| C09K 8/94 | (2006.01) |

(52) U.S. Cl.
CPC ............... *C09K 8/38* (2013.01); *C09K 8/518* (2013.01); *C09K 8/594* (2013.01); *C09K 8/703* (2013.01); *C09K 8/94* (2013.01); *C09K 2208/10* (2013.01)

(58) Field of Classification Search
CPC .................... B01F 3/04–04992; B01F 2003/04092–04971; C04B 38/103; C04B 28/021; C09K 8/42–493; C09K 8/516–518; C09K 8/594
See application file for complete search history.

(56) References Cited

U.S. PATENT DOCUMENTS

| 2008/0245274 A1* | 10/2008 | Ramme .................. C04B 28/08 |
| | | 106/679 |
| 2013/0029883 A1 | 1/2013 | Dismuke et al. |
| 2017/0240800 A1* | 8/2017 | Li .......................... C09K 8/536 |
| 2019/0119560 A1* | 4/2019 | Zhao ....................... C09K 8/594 |

FOREIGN PATENT DOCUMENTS

| CN | 102746841 A | 10/2012 |
| CN | 102766450 B | 3/2014 |
| CN | 103694983 A | 4/2014 |
| CN | 103721625 A | 4/2014 |
| CN | 104152126 A | 11/2014 |
| CN | 105238380 A | 1/2016 |
| CN | 106753307 A | 5/2017 |
| CN | 107841302 A | 3/2018 |
| CN | 105038756 B | 4/2018 |

OTHER PUBLICATIONS

Definition of composite. IUPAC Compendium of Chemical Terminology. 2014. (Year: 2014).*
Xue et al. Viscosity and stability of ultra-high internal phase CO2-in-water foams stabilized with surfactants and nanoparticles with or without polyelectrolytes. Journal of Colloid and Interface Science, 2016, 461, 383-395. Available online Aug. 19, 2015. (Year: 2015).*
Machine Translation of CN103721625A. Apr. 16, 2014 (Year: 2014).*
The Chinese First Examination Report of corresponding Chinese application No. 201811375287.0, dated Sep. 24, 2019.
The Chinese Notification to Grant Patent of corresponding Chinese application No. 201811375287.0, dated Oct. 29, 2019.

* cited by examiner

*Primary Examiner* — Stephen E Rieth
(74) *Attorney, Agent, or Firm* — J.C. Patents

(57) ABSTRACT

The disclosure discloses an ultra-dry three-phase flue gas foam for oil-gas fields and preparation method thereof. The ultra-dry three-phase flue gas foam is produced by a gas phase, a liquid phase and a solid phase; the gas phase is a flue gas; the foaming solution is an aqueous solution of a surfactant, a pH adjuster, and an inorganic salt; the solid phase is a composite of fly ash and nano silica; the foam quality is 90%-99%. The solid phase foam stabilizer is a compounded system of fly ash particles and nano silica particles, which is not only low in cost but also can form a stable solid particle adsorption layer on the foam film. Thus the instability of the foam such as film rupture, gas diffusion and bubble aggregation can be greatly reduced, and the stability of the foam can be effectively improved.

9 Claims, No Drawings

ULTRA-DRY THREE-PHASE FLUE GAS FOAM FOR OIL-GAS FIELDS AND PREPARATION METHOD THEREOF

CROSS-REFERENCE TO RELATED APPLICATIONS

This application claims priority to Chinese Patent Application No. 201811375287.0, filed on Nov. 19, 2018, entitled "Ultra-dry three-phase flue gas foam for oil-gas fields and preparation method thereof", which is incorporated herein by reference in its entirety.

TECHNICAL FIELD

The present disclosure relates to an ultra-dry three-phase flue gas foam for oil-gas fields and a preparation method thereof, and belongs to the technical field of oil-gas fields development engineering.

BACKGROUND

Foam fluids are widely used in industrial development of oil-gas fields all over the world. Due to its unique gas-liquid mixed structure, complex foam film morphology and variable physical properties, the foam plays an irreplaceable role in petroleum engineering, and has been awarded as an efficient smart fluid. At present, the foam has been applied in the whole process of oil and gas development, for example, the foam has been successfully used for foam drilling fluid, foam completion fluid and foam fracturing fluid in the drilling and completion engineering process. In oil production engineering, various nitrogen and carbon dioxide foams have been applied in operations such as profile control, water shutoff, oil displacement, acidification, etc., and their unique roles in enhanced oil recovery have been continuously proven; in addition, foam also plays a prominent role in various workover processes such as sand wash, well washing, drainage, and induced-flow.

With the increasing consumption of oil and gas energy, the oil and gas industrial development faces greater challenges. Especially, when the mature oil fields entered a production reduction period; the large-scale development of new oil fields continues to enlarge; the desert, Gobi, and plateau environments have problems such as extremely lack of water, high material cost, and ecological fragility, increasing number of underground deep wells and ultra-deep wells, and more harsh environments (such as high temperature and ultra-high temperature) of oil and gas reservoirs. Higher requirements are raised for various oil and gas development technologies. At present, traditional foam fluids have prominent problems under the new oil and gas development situations. First, although the presence of gas in the foam reduces the amount of water to a certain extent, the foam quality is low (about 50%~80%), that is, the liquid accounts for a relatively high proportion (about 20%~50%) of foam. This means the process that utilizing the foam will still need a lot of water, which will be a limit for foam being used in extremely water-deficient areas. For example, in the Chinese patent document CN102766450B (application number: 201210290466.0), a nitrogen foam fracturing fluid used for the production of coalbed methane and preparation method thereof is disclosed. The foam is comprised of two phases: a gas phase and a liquid phase. The gas phase is nitrogen gas, and the foaming agent in the liquid phase is a mixture of sodium dodecyl sulfate and N-(2-hydroxypropyl) perfluorocaprylamide with a mass ratio of 8~10:1, and the foam stabilizer is $C_{16}$~$C_{20}$ alkyl trimethylammonium chloride, the gel breaker is a redox mixture of ammonium persulfate and sodium sulfite with a mass ratio of 1.0~2.0:1. The liquid phase is an aqueous solution comprises the foaming agent with the concentration of 0.20~0.50% by weight, the foam stabilizer with the concentration of 0.4~1.0% by weight, and the gel breaker with the concentration of 0.10~0.30% by weight. The gas phase to liquid phase ratio is 2~4:1 by volume ratio, and the corresponding foam quality is 65%~80%. The foam fracturing fluid has the advantages of less damage to the coal formation, low fluid loss, small friction resistance, rapid flowback and strong sand-carrying capacity. However, in the application process, at least 1 $m^3$ of water needs to be consumed for per 2 $m^3$ of gas injection, and the water consumption in large-scale foam fracturing is still high, which is difficult to meet the requirements of fracturing in water-deficient areas. In addition, the nitrogen used in the gas phase of the foam will further increase the overall application cost of the foam, and it is necessary to find a low-cost internal phase gas as a substitute for the foam system.

At the same time, as it is difficult to maintain the stability of the foam under high temperature formation conditions, the viscosity of foam in the traditional foaming solution is improved by adding various organic foam stabilizers such as vegetable gum, polyacrylamide and micelles so as to reinforce the stability of the foam. However, the thermal stability of organic enhancers is limited, thereby limiting the stability of the foam. In recent years, the technology that reinforcing the foam with inorganic nanomaterial has been applied in the petroleum engineering industry. The new reinforced foam has attracted more and more attention, because inorganic nanoparticles have excellent properties such as small size, high surface free energy, and high thermal stability. The inorganic nanoparticles can absorb at the liquid-liquid and gas-liquid interface so as to increase the viscoelasticity of the foam film and achieve the purpose of stabilizing foam. For example, in the Chinese patent document CN105038756B (Application No.: 201510398725.5), a carbon dioxide foam system with hydrophilic nanoparticles added therein for oil displacement and preparation method thereof is disclosed, and the foaming solution comprises the nonionic surfactant with the concentration of 0.1~0.3% by weight, the hydrophilic nanoparticles with the concentration of 1~2% by weight, the inorganic salts with the concentration of 0.01~0.2% by weight and the balance of water. The carbon dioxide foam reinforced with the hydrophilic nanoparticles has stronger thermal stability and salt tolerance than that of the carbon dioxide foam generated by conventional surfactants. However, the cost of using nanoparticles as the enhancers of foam is still high, especially when the surface of the nanoparticles is modified to obtain suitable wettability, which will further improve the application cost of the nanoparticles. In addition, when the concentration of the enhancers in the foaming solution is constant, the lower the foam quality, the higher the liquid phase content in the foam, and the larger the total usage amount of the enhancers, the higher the use cost of the foam. Therefore, under the condition that the stability and other work performance of the foam should be maintained, increasing the foam quality is an effective way to reduce the application cost of foam.

SUMMARY

The object of the present disclosure is to provide an ultra-dry three-phase flue gas foam for oil-gas fields and preparation method thereof, and the prepared ultra-dry three-phase flue gas foam has a high foam quality of 90%~99%.

The foam quality of the present disclosure refers to the volume percentage of the gas phase in the foam to the total volume of the foam.

The ultra-dry three-phase flue gas foam for oil-gas fields provided by the disclosure is produced by a gas phase, a liquid phase and a solid phase;

the gas phase is a flue gas produced by a coal-fired power plant;

the liquid phase is an aqueous solution of a surfactant, a pH adjuster, and an inorganic salt;

the solid phase is a composite of fly ash and nano silica;

the foam quality of ultra-dry three-phase flue gas foam for the oil-gas fields is 90%~99%.

In the above-mentioned ultra-dry three-phase flue gas foam for oil-gas fields, the flue gas is subjected to desulfurization, denitration and deoxidation treatment;

a total volume fraction of nitrogen and carbon dioxide in the flue gas is 90%.

In the above-mentioned ultra-dry three-phase flue gas foam for oil-gas fields, the surfactant is a composite of sodium α-olefin sulfonate and sodium dodecylbenzene sulfonate;

a mass ratio of the sodium α-olefin sulfonate to the sodium dodecylbenzene sulfonate is 1:4~5;

the carbon atom number of the sodium α-olefin sulfonate is 14 to 18.

In the above-mentioned ultra-dry three-phase flue gas foam for oil-gas fields, the pH adjuster is sodium bicarbonate, sodium carbonate or potassium carbonate; the inorganic salt is potassium chloride, which is mainly used for preventing swelling of clay in the formation.

In the above-mentioned ultra-dry three-phase flue gas foam for oil-gas fields, the liquid phase is composed by the surfactant with the concentration of 0.1~0.5% by weight, the pH adjuster with the concentration of 0.025~0.085% by weight and the inorganic salt with the concentration of 0.5~2% by weight, and the balance of water:

In the above-mentioned ultra-dry three-phase flue gas foam for oil-gas fields, the concentration ratio (i.e. mass concentration ratio) of the solid phase to the surfactant is 1.5~1.75:1, specifically 1.5:1.

Excessive amount of surfactant will cause competitive adsorption between surfactant and the solid phase at a gas-liquid interface of the foam, resulting in poor foam stability, while too low content of surfactant will not achieve good foaming effect. Under the concentration ratio of the surfactant designed by the present disclosure, not only a good foaming effect can be achieved, the adsorption stability of the solid phase at the gas-liquid interface of the foam also can be improved.

In the above-mentioned ultra-dry three-phase flue gas foam for oil-gas fields, the fly ash is obtained by electrostatic capture of the coal-fired power plant.

In the above-mentioned ultra-dry three-phase flue gas foam for oil-gas fields, the fly ash is spherical, and an average particle diameter of the fly ash is ≤15 μm, wherein the total mass proportion of quartz ($SiO_2$), mullite ($Al_6Si_2O_{13}$), and iron oxide ($Fe_2O_3$) is ≥80 wt %;

the particle diameter of nano silica particles is 8~30 nm and the specific surface area is 100~300 m$^2$/g;

the surfaces of the nano silica particles are hydrophilic, and the wetting angle of the surfaces to water is 30°~65°, thus the nano silica particles can be well dispersed in tap water and ground water.

The mass ratio of the fly ash to the nano silica particles is 8~9:1, such as 8.5:1. Under the above ratio, the fly ash particles can replace the nano silica particles to stabilize the foam. And at the same time, the usage amount of nano silica particles and application costs can be significantly reduced. In addition, the foam stabilization effect of the fly ash particles also can be improved by a small amount of nano silica particles in the solid phase. A more stable solid particle adsorption layer at the gas-liquid interface of the foam can be formed by using the fly ash and nano silica particles. Thus the instability of foam such as foam film rupture, gas diffusion and bubble aggregation can be greatly reduced, and the stability of the foam can be effectively improved.

The present disclosure further provides a preparation method of the ultra-dry three-phase flue gas foam for the oil-gas fields, including the following steps:

1) taking a portion of the surfactant to prepare an aqueous solution, an aqueous surfactant solution is obtained;

2) adding the solid phase to the aqueous surfactant solution, and stirring sufficiently to uniformly disperse the solid phase to obtain a first mixed liquid;

3) adding the remaining amount of the surfactant to the first mixed liquid, slowly stirring until the surfactant is completely dissolved to obtain a second mixed liquid;

4) adding the pH adjuster and the inorganic salt to the second mixed liquid, slowly stirring until the pH adjuster and the inorganic salt are completely dissolved to obtain a third mixed liquid;

5) simultaneously injecting the flue gas and the third mixed liquid into a foam generator, and after mixing, the ultra-dry three-phase flue gas foam for the oil-gas fields is obtained;

The injection speed of the flue gas is not less than 9 times of that of the third mixed liquid, that is, the injection amount of the flue gas per unit time is not lower than 9 times of the injection amount of the third mixed liquid.

In the above preparation method, in the step 1), specifically, ¼~½ of the surfactant, such as ⅓, may be taken.

The present disclosure has the following beneficial effects:

(1) The ultra-dry three-phase flue gas foam prepared by the present disclosure has a very small content of water, and the water consumption in the preparation process is also extremely low, thus the ultra-dry three-phase flue gas foam is suitable to be used for the development of oil-gas fields in water-deficient areas;

(2) The ultra-dry three-phase flue gas foam prepared by the present disclosure uses two industrial emissions, flue gas and fly ash, as raw materials, which turning waste into treasure, not only reducing industrial pollution sources of atmospheric environment, but also reducing the cost of foam fluids in oil-gas fields.

(3) The ultra-dry three-phase flue gas foam prepared by the present disclosure has the characteristics of simple preparation process and high viscosity. Thus the ultra-dry three-phase flue gas foam can be applied to various oil-gas fields development works such as fracturing, oil displacement, profile control, liquid discharge, sand wash, well washing and the like.

(4) The solid phase foam stabilizer used in the ultra-dry three-phase flue gas foam prepared by the present disclosure is a compounded system of fly ash particles and nano silica particles, which is not only low in cost but also can form a stable solid particle adsorption layer on the foam film. Thus the instability of the foam such as foam film rupture, gas diffusion and bubble aggregation can be greatly reduced, and the stability of the foam can be effectively improved.

(5) The ultra-dry three-phase flue gas foam prepared by the disclosure has the following excellent characteristics: adapting high temperatures such as 230° C., improved stability with the increasing of pressure, good thermal stability and pressure resistance. Thus the ultra-dry three-phase flue gas foam can be applied for the development of high pressure and high temperature oil-gas layers.

DESCRIPTION OF THE EMBODIMENTS

The experimental methods used in the following embodiments are conventional methods unless otherwise specified.

The materials, reagents and the like used in the following embodiments are commercially available unless otherwise specified.

Embodiment 1: Ultra-Dry Three-Phase Flue Gas Foam for Oil-Gas Fields

The raw materials comprise a gas phase, a liquid phase and a solid phase, and their specific components are as follows:

the gas phase is the flue gas produced by the coal-fired power plant, and the flue gas has been subjected to desulfurization, denitrification and deoxidation processes, the total volume fraction of nitrogen and carbon dioxide in the flue gas is ≈93%.

In the solid phase, the maximum particle size of the fly ash is 46 μm, and the average particle diameter is 1.3 μm. The mass ratio of $SiO_2$, $Al_6Si_2Oi_3$ and $Fe_2O_3$ in fly ash was 63%, 26% and 6%, respectively. The wetting angle of the fly ash particle to distilled water is 57°; the average particle size of nano-silica in the solid phase is about 15 nm, the specific surface area is 160 $m^2$/g, the wetting angle of the nano-silica particles to distilled water is 63°; and the mass ratio of fly ash to nano-silica particles is 8.5:1.

The composition of the liquid phase is as follows: surfactant with the concentration of 0.4% by weight, $NaHCO_3$ with the concentration of 0.025% by weight, KCl with the concentration of 0.5% by weight, and the balance of water, wherein the surfactant is a mixture of sodium α-olefin sulfonate and sodium dodecylbenzene sulfonate with a mass ratio of 1:4, wherein the carbon atom number of the sodium α-olefin sulfonate is 14 to 18.

The preparation of the ultra-dry three-phase flue gas foam for oil-gas fields comprises the following steps:

mixing ⅓ of the surfactant with a preset percentage with water, stirring until the surfactant is completely dissolved, an aqueous surfactant solution is obtained; adding the solid phase with a mass fraction of 0.6 wt % (the concentration ratio of solid phase and surfactant in the formed foam is 1.5:1) to the aqueous surfactant solution, and stirring the mixture sufficiently until the solid particles are uniformly dispersed, the first mixed liquid is prepared; adding ⅔ of the surfactant with a preset percentage to the first mixed liquid, slowly stirring until the surfactant is completely dissolved, the second mixed liquid is prepared; adding $NaHCO_3$ and KCl with a preset percentage to the second mixed liquid, slowly stirring until $NaHCO_3$ and KCl are completely dissolved, the third mixed liquid is prepared; injecting the flue gas and the third mixed liquid into the foam generator simultaneously, wherein the injection speed of the flue gas of the coal-fired power plant is controlled to be 9 times of that of the third mixed liquid, and after being thoroughly mixed by the foam generator under normal temperature and normal pressure, an ultra-dry three-phase flue gas foam is made, and the foam quality is 90%.

Injecting the foam into the visual crack model after its preparation, stopping the flow of the foam, observing and recording the change of the particle size of foam over time. The specific observation method refers to the experimental method in "Physical simulation of the flow characteristics of foam in cracks" the Journal of Central South University (Natural Science Edition), Vol. 48, No. 9, 2017 or "Wall slipping behavior of foam with nanoparticle-armored bubbles and its flow resistance factor in cracks" Scientific Reports, Vol. 7, No. 1, 2017. The formed foam is dense and uniform, and the average particle diameter of the foam observed at 5 minutes, 15 minutes, and 60 minutes is 52 μm, 61 μm, and 96 μm, respectively, the water content in the foam is only about 10%, and the foam film is thin and stable, the bubbles aggregation is slow and the foam shows good stability.

Injecting the foam into the coaxial cylinder test unit of the Anton Paar MCR302 rheometer after its preparation. When a rotor shear rate is 170 $s^{-1}$, and under normal temperature and normal pressure, the initial apparent viscosity of the foam is about 85 mPa·s, the apparent viscosity of the foam at about 60 minutes is about 52 mPa·s. The apparent viscosity of the third mixed liquid (i.e., foaming solution) was stabilized at 2.6 mPa·s under the same conditions, and the viscosity of the foam corresponding to third mixed liquid was greatly increased.

After the foam preparation is completed, injecting the foam into the coaxial cylinder test unit of the Anton Paar MCR302 rheometer under the back pressure of 10 MPa. When a rotor shear rate is 170 $s^{-1}$ and under a normal temperature, the initial apparent viscosity of the foam is about 96 mPa·s, the apparent viscosity at 60 minutes is about 87 mPa·s. The foam has a higher viscosity, and longer stabilization time under a high pressure than a normal pressure, and the foam exhibits good pressure resistance.

After the foam preparation is completed, injecting the foam into the coaxial cylinder test unit of Anton Paar MCR302 rheometer under the back pressure of 10 MPa. When a rotor shear rate is 170 $s^{-1}$ and the temperature is 230° C., the initial apparent viscosity of the foam is about 62 mPa·s. The apparent viscosity of the foam is about 30 mPa·s after 60 minutes. The foam with the foam quality of 90% can still exist at 230° C. and exhibit a certain viscosity. The foam shows good thermal stability.

Embodiment 2: Ultra-Dry Three-Phase Flue Gas Foam for Oil-Gas Fields

The raw materials comprise a gas phase, a liquid phase and a solid phase, and the specific components are as follows:

the gas phase is the flue gas produced by the coal-fired power plant, and the flue gas has been subjected to desulfurization, denitrification and deoxidation processes, the total volume fraction of nitrogen and carbon dioxide in the flue gas is ≈93%.

In the solid phase, the maximum particle size of fly ash is 13 μm, and the average particle diameter is 0.5 μm. The mass ratio of $SiO_2$, $Al_6Si_2O_{13}$ and $Fe_2O_3$ in fly ash was 71 wt %, 18 wt %, and 3 wt %, respectively. The wetting angle of the fly ash particle to distilled water is 54°; the average particle size of nano-silica in the solid phase is about 15 nm, the specific surface area is 160 $m^2$/g, the wetting angle of the nano-silica particles to distilled water is 63°; and the mass ratio of fly ash to nano-silica particles is 8.5:1.

The composition of the liquid phase is as follows: surfactant with the concentration of 0.4% by weight, $NaHCO_3$ with the concentration of 0.025% by weight, KCl with the concentration of 0.5% weight, and the balance of water, wherein the surfactant is a mixture of sodium α-olefin sulfonate and sodium dodecylbenzene sulfonate with a mass ratio of 1:4, wherein the carbon atom number of the sodium α-olefin sulfonate is 14 to 18.

The preparation of the ultra-dry three-phase flue gas foam for oil-gas fields comprises the following steps:

mixing ⅓ of surfactant with a preset percentage with water, stirring until the surfactant is completely dissolved, an aqueous surfactant solution is obtained; adding the solid phase with a mass fraction of 0.6 wt % (the concentration ratio of solid phase and surfactant in the formed foam is 1.5:1) to the aqueous surfactant solution, and stirring the mixture sufficiently until the solid particles are uniformly dispersed, the first mixed liquid is prepared; adding ⅔ of the surfactant with a preset percentage to the first mixed liquid, slowly stirring until the surfactant is completely dissolved, a second mixed liquid is prepared; adding $NaHCO_3$ and KCl with a preset percentage to the second mixed liquid, slowly stirring until $NaHCO_3$ and KCl are completely dissolved, a third mixed liquid is prepared; injecting the flue gas and the third mixed liquid into the foam generator simultaneously, wherein the injection speed of the flue gas of the coal-fired power plant is controlled to be 12 times of that of the third mixed liquid, and after being thoroughly mixed by the foam generator under 95° C. and normal pressure, an ultra-dry three-phase flue gas foam is made, and the foam quality is 92.3%.

Injecting the foam into the visual crack model after its preparation, stopping the flow of the foam, observing and recording the change of the particle size of foam over time. The specific observation method refers to the experimental method in "Physical simulation of the flow characteristics of foam in cracks" the Journal of Central South University (Natural Science Edition), Vol. 48, No. 9, 2017 or "Wall slipping behavior of foam with nanoparticle-armored bubbles and its flow resistance factor in cracks" Scientific Reports, Vol. 7, No. 1, 2017. The formed foam is dense and uniform, and the average particle diameter of the foam observed at 5 minutes, 15 minutes, and 60 minutes is 47 μm, 64 μm, and 118 μm, respectively, the water content in the foam is only about 7.7%, and the foam film is thin and stable, the bubbles aggregation is slow and the foam shows good temperature resisting stability.

Injecting the foam into the coaxial cylinder test unit of the Anton Paar MCR302 rheometer after its preparation. When a rotor shear rate is 170 $s^{-1}$, and under a normal temperature, and a normal pressure, the initial apparent viscosity of the foam is about 76 mPa·s, the apparent viscosity of the foam at about 60 minutes is about 49 mPa·s. The apparent viscosity of the third mixed liquid (i.e., foaming solution) was stabilized at 2.1 mPa·s under the same conditions, and the viscosity of the foam corresponding to third mixed liquid was greatly increased.

After the foam preparation is completed, injecting the foam into the coaxial cylinder test unit of the Anton Paar MCR302 rheometer under the back pressure of 10 MPa. When a rotor shear rate is 170 $s^{-1}$ and under a normal temperature, the initial apparent viscosity of the foam is about 85 mPa·s. The apparent viscosity of the foam after 60 minutes is about 71 mPa·s. The foam has a higher viscosity and longer stabilization time under a high pressure than a normal pressure, and the foam exhibits good pressure resistance.

After the foam preparation is completed, injecting the foam into the coaxial cylinder test unit of Anton Paar MCR302 rheometer under the back pressure of 10 MPa. When a rotor shear rate is 170 $s^{-1}$ and the temperature is 230° C., the initial apparent viscosity of the foam is about 53 mPa·s. The apparent viscosity of the foam is about 29 mPa·s after 60 minutes. The foam with the foam quality of 92.3% can still exist at 230° C. and exhibit a certain viscosity. The foam shows good thermal stability.

Embodiment 3: Ultra-Dry Three-Phase Flue Gas Foam for Oil-Gas Fields

The raw materials comprise a gas phase, a liquid phase and a solid phase, and the specific components are as follows:

the gas phase is the flue gas produced by the coal-fired power plant, and the flue gas has been subjected to desulfurization, denitrification and deoxidation processes, the total volume fraction of nitrogen and carbon dioxide in the flue gas is ≈93%.

In the solid phase, the maximum particle size of fly ash is 46 μm, and the average particle diameter is 1.3 μm. The mass ratio of $SiO_2$, $Al_6Si_2O_{13}$ and $Fe_2O_3$ in fly ash was 63 wt %, 26 wt %, and 6 wt %, respectively. The wetting angle of the fly ash particle to distilled water is 57°; the average particle size of nano-silica in the solid phase is about 15 nm, the specific surface area is 160 $m^2/g$, the wetting angle of the nano-silica particles to distilled water is 63°; and the mass ratio of fly ash to nano-silica particles is 8:1.

The composition of the liquid phase is as follows: surfactant with the concentration of 0.47% by weight, $NaHCO_3$ with the concentration of 0.033% by weight, KCl with the concentration of 0.5% by weight, and the balance of water, wherein the surfactant is a mixture of sodium α-olefin sulfonate and sodium dodecylbenzene sulfonate with a mass ratio of 1:4.5, wherein the carbon atom number of the sodium α-olefin sulfonate is 14 to 18.

The preparation of the ultra-dry three-phase flue gas foam for oil-gas fields comprises the following steps:

mixing ⅓ of surfactant with a preset percentage with water, stirring until the surfactant is completely dissolved, an aqueous surfactant solution is obtained; adding the solid phase with a mass fraction of 0.6 wt % (the concentration ratio of solid phase and surfactant in the formed foam is 1.5:1) to the aqueous surfactant solution, and stirring the mixture sufficiently until the solid particles are uniformly dispersed, the first mixed liquid is prepared; adding ⅔ of the surfactant with a preset percentage to the first mixed liquid, slowly stirring until the surfactant is completely dissolved, a second mixed liquid is prepared; adding $NaHCO_3$ and KCl with a preset percentage to the second mixed liquid, slowly stirring until $NaHCO_3$ and KCl are completely dissolved, a third mixed liquid is prepared; injecting the flue gas of the coal-fired power plant and the third mixed liquid into the foam generator simultaneously, wherein the injection speed of the flue gas of the coal-fired power plant is controlled to be 19 times of that of the third mixed liquid, and after being thoroughly mixed by the foam generator under normal temperature and normal pressure, an ultra-dry three-phase flue gas foam is made, and the foam quality is 95%.

Injecting the foam into the visual crack model after its preparation, stopping the flow of the foam, observing and recording the change of the particle size of foam over time. The specific observation method refers to the experimental method in "Physical simulation of the flow characteristics of foam in cracks" the Journal of Central South University (Natural Science Edition), Vol. 48, No. 9, 2017 or "Wall slipping behavior of foam with nanoparticle-armored bubbles and its flow resistance factor in cracks" Scientific Reports, Vol. 7, No. 1, 2017. The formed foam is dense and uniform, and the average particle diameter of the foam observed at 5 minutes, 15 minutes, and 60 minutes is 152 μm, 186 μm, and 207 μm, respectively, the water content in the foam is only about 5%, and the foam film is thin and stable, the bubbles aggregation is slow and the foam shows good temperature resisting stability.

Injecting the foam into the coaxial cylinder test unit of the Anton Paar MCR302 rheometer after its preparation. When a rotor shear rate is 170 $s^{-1}$, and under a normal temperature, and a normal pressure, the initial apparent viscosity of the foam is about 47 mPa·s, the apparent viscosity of the foam at about 60 minutes is about 36 mPa·s. The apparent viscosity of the third mixed liquid (i.e., foaming solution) was stabilized at 3.1 mPa·s under the same conditions, and the viscosity of the foam corresponding to third mixed liquid was greatly increased.

After the foam preparation is completed, injecting the foam into the coaxial cylinder test unit of the Anton Paar MCR302 rheometer under the back pressure of 10 MPa. When a rotor shear rate is 170 $s^{-1}$ and under a normal temperature, the initial apparent viscosity of the foam is about 59 mPa·s. The apparent viscosity of the foam after 30 minutes is about 52 mPa·s. The foam has a higher viscosity and longer stabilization time under a high pressure than a normal pressure, and the foam exhibits good pressure resistance.

After the foam preparation is completed, injecting the foam into the coaxial cylinder test unit of Anton Paar MCR302 rheometer under the back pressure of 10 MPa. When a rotor shear rate is 170 $s^{-1}$ and the temperature is 230° C., the initial apparent viscosity of the foam is about 36 mPa·s. The apparent viscosity of the foam is about 19 mPa·s after 30 minutes. The foam with the foam quality of 95% can still exist at 230° C. and exhibit a certain viscosity. The foam shows good thermal stability.

What is claimed is:

1. An ultra-dry three-phase flue gas foam for oil-gas fields, which is produced by a gas phase, a liquid phase and a solid phase, wherein
   the gas phase is a flue gas produced by a coal-fired power plant;
   the liquid phase is an aqueous solution of a surfactant, a pH adjuster, and an inorganic salt;
   the surfactant is a mixture of sodium a-olefin sulfonate and sodium dodecylbenzene sulfonate;
   a mass ratio of the sodium a-olefin sulfonate to the sodium dodecylbenzene sulfonate is 1:4-5;
   a carbon atom number of the sodium α-olefin sulfonate is 14 to 18;
   the solid phase is a mixture of fly ash and nano silica;
   a foam quality of the three-phase flue gas foam is 90%.

2. The ultra-dry three-phase flue gas foam for oil-gas fields according to claim 1, wherein the flue gas is subjected to desulfurization, denitration and deoxidation treatment;
   a total volume fraction of nitrogen and carbon dioxide in the flue gas is ≥90%.

3. The ultra-dry three-phase flue gas foam for oil-gas fields according to claim 1, wherein the pH adjuster is sodium bicarbonate, sodium carbonate or potassium carbonate; the inorganic salt is potassium chloride.

4. The ultra-dry three-phase flue gas foam for oil-gas fields according to claim 3, wherein the liquid phase is composed of the surfactant with a concentration of 0.1-0.5% by weight, the pH adjuster with a concentration of 0.025-0.085% by weight, the inorganic salt with a concentration of 0.5-2% by weight, and the balance of water.

5. The ultra-dry three-phase flue gas foam for oil-gas fields according to claim 1, wherein the liquid phase is composed of the surfactant with a concentration of 0.1-0.5% by weight, the pH adjuster with a concentration of 0.025-0.085% by weight, the inorganic salt with a concentration of 0.5-2% by weight, and the balance of water.

6. The ultra-dry three-phase flue gas foam for oil-gas fields according to claim 1, wherein in the three-phase flue gas foam for the oil-gas fields, a mass concentration ratio of the solid phase to the surfactant is 1.5-1.75:1.

7. The ultra-dry three-phase flue gas foam for oil-gas fields according to claim 1, wherein the fly ash is obtained by electrostatic capture of the coal-fired power plant.

8. The ultra-dry three-phase flue gas foam for oil-gas fields according to claim 1, wherein the fly ash is spherical, and an average particle diameter of the fly ash is ≤15 μm;
   a particle diameter of the nano silica particles is 8-30 nm and a specific surface area is 100-300 $m^2/g$;
   a wetting angle of surfaces of the nano silica particles to water is 30°-65°;
   a mass ratio of the fly ash to the nano silica particles is 8-9:1.

9. A method of preparing the ultra-dry three-phase flue gas foam for oil-gas fields according to claim 1, comprising the steps of:
   1) taking a portion of the surfactant to prepare an aqueous surfactant solution;
   2) adding the solid phase to the aqueous surfactant solution to obtain a first mixed liquid;
   3) adding the remaining amount of the surfactant to the first mixed liquid to obtain a second mixed liquid;
   4) adding the pH adjuster and the inorganic salt to the second mixed liquid to obtain a third mixed liquid;
   5) simultaneously injecting the flue gas and the third mixed liquid into a foam generator, and after mixing, the ultra-dry three-phase flue gas foam for oil-gas fields is obtained;
   an injection speed of the flue gas is not less than 9 times of an injection speed of the third mixed liquid.

* * * * *